United States Patent
Iuchi et al.

(10) Patent No.: US 10,132,519 B2
(45) Date of Patent: Nov. 20, 2018

(54) AIR CONDITIONING SYSTEM

(71) Applicant: Mitsubishi Electric Corporation, Tokyo (JP)

(72) Inventors: Toshiki Iuchi, Tokyo (JP); Kazuyuki Katayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/560,337

(22) PCT Filed: Apr. 3, 2015

(86) PCT No.: PCT/JP2015/060668
§ 371 (c)(1),
(2) Date: Sep. 21, 2017

(87) PCT Pub. No.: WO2016/157537
PCT Pub. Date: Oct. 6, 2016

(65) Prior Publication Data
US 2018/0073761 A1    Mar. 15, 2018

(51) Int. Cl.
*F24F 11/30*    (2018.01)
*F24F 11/89*    (2018.01)
(Continued)

(52) U.S. Cl.
CPC .............. *F24F 11/30* (2018.01); *F24F 11/62* (2018.01); *F24F 11/89* (2018.01);
(Continued)

(58) Field of Classification Search
CPC ....... G10L 15/22; G10L 15/265; G10L 15/28; G06F 17/2785
See application file for complete search history.

(56) References Cited

U.S. PATENT DOCUMENTS 6,125,341 A * 9/2000 Raud ................. G10L 15/26
704/255
6,351,698 B1 * 2/2002 Kubota ............ B60R 16/0231
340/988
(Continued)

FOREIGN PATENT DOCUMENTS

JP   H07-139777 A    5/1995
JP   H09-022296 A    1/1997
(Continued)

OTHER PUBLICATIONS

International Search Report of the International Searching Authority dated Jun. 30, 2015 for the corresponding international application No. PCT/JP2015/060668 (and English translation).
(Continued)

*Primary Examiner* — Eric Yen
(74) *Attorney, Agent, or Firm* — Posz Law Group, PLC

(57) ABSTRACT

An air conditioning system includes a collector that obtains user's voice data; a voice recognizer that generates character-string data on the basis of the voice data; a memory that stores therein a search table having a standard keyword that indicates the type of sensitivity to the environment inside a room and derivative keywords that indicate a same type of sensitivity as the standard keyword, while indicating different sensitivity levels; an analyzer that determines the type and level of user's sensitivity on the basis of the character-string data and the search table; and a controller that outputs a control signal to an adjustment device in an indoor device, the adjustment device adjusting the environment inside a room on the basis of the type and level of sensitivity, which are determined by the analyzer.

14 Claims, 13 Drawing Sheets

(51) Int. Cl.
*G10L 15/22* (2006.01)
*G10L 15/26* (2006.01)
*G10L 15/28* (2013.01)
*G06F 17/27* (2006.01)
*G06T 7/70* (2017.01)
*G10L 15/08* (2006.01)
*H04N 7/18* (2006.01)
*F24F 11/62* (2018.01)
*F24F 120/10* (2018.01)
*F24F 11/64* (2018.01)
*F24F 120/12* (2018.01)
*F24F 130/40* (2018.01)
*F24F 110/10* (2018.01)

(52) U.S. Cl.
CPC ............ *G06F 17/2785* (2013.01); *G06T 7/70* (2017.01); *G10L 15/08* (2013.01); *G10L 15/22* (2013.01); *G10L 15/265* (2013.01); *G10L 15/28* (2013.01); *H04N 7/183* (2013.01); *F24F 11/64* (2018.01); *F24F 2110/10* (2018.01); *F24F 2120/10* (2018.01); *F24F 2120/12* (2018.01); *F24F 2130/40* (2018.01); *G10L 2015/088* (2013.01); *G10L 2015/223* (2013.01)

(56) References Cited

U.S. PATENT DOCUMENTS

| | | | | |
|---|---|---|---|---|
| 6,879,953 | B1* | 4/2005 | Oishi | G10L 15/1822 |
| | | | | 704/231 |
| 2004/0243392 | A1* | 12/2004 | Chino | G06F 17/27 |
| | | | | 704/7 |
| 2007/0055529 | A1* | 3/2007 | Kanevsky | G10L 15/1822 |
| | | | | 704/275 |
| 2007/0256435 | A1* | 11/2007 | Koyama | B60H 1/00757 |
| | | | | 62/157 |
| 2014/0163957 | A1* | 6/2014 | Tesch | H04L 51/063 |
| | | | | 704/9 |
| 2015/0073907 | A1* | 3/2015 | Purves | G06Q 20/32 |
| | | | | 705/14.58 |
| 2015/0325240 | A1* | 11/2015 | Li | G06K 9/00335 |
| | | | | 704/231 |
| 2016/0018123 | A1* | 1/2016 | Yabunouchi | F24F 11/30 |
| | | | | 700/278 |
| 2016/0379634 | A1* | 12/2016 | Yamamoto | G10L 15/22 |
| | | | | 704/251 |

FOREIGN PATENT DOCUMENTS

| | | |
|---|---|---|
| JP | H11-119791 A | 4/1999 |
| JP | 2000-074465 A | 3/2000 |
| JP | 2003-185221 A | 7/2003 |
| JP | 2007-132616 A | 5/2007 |
| JP | 2013-015271 A | 1/2013 |
| JP | 2013-207660 A | 10/2013 |
| JP | 2014-043961 A | 3/2014 |
| JP | 2015-029382 A | 2/2015 |

OTHER PUBLICATIONS

Communication pursuant to Rule 62(a)(1) EPC dated Jan. 2, 2018 issued in corresponding EP patent application No. 15866383.1 (and English translation).

Office Action dated Nov. 21, 2017 issued in corresponding JP patent application No. 2017-509136 (and English translation).

Communication pursuant to Rule 62(a)(1) EPC dated Jan. 2, 2018 issued in corresponding JP patent application No. 15866383.1 (and English translation).

* cited by examiner

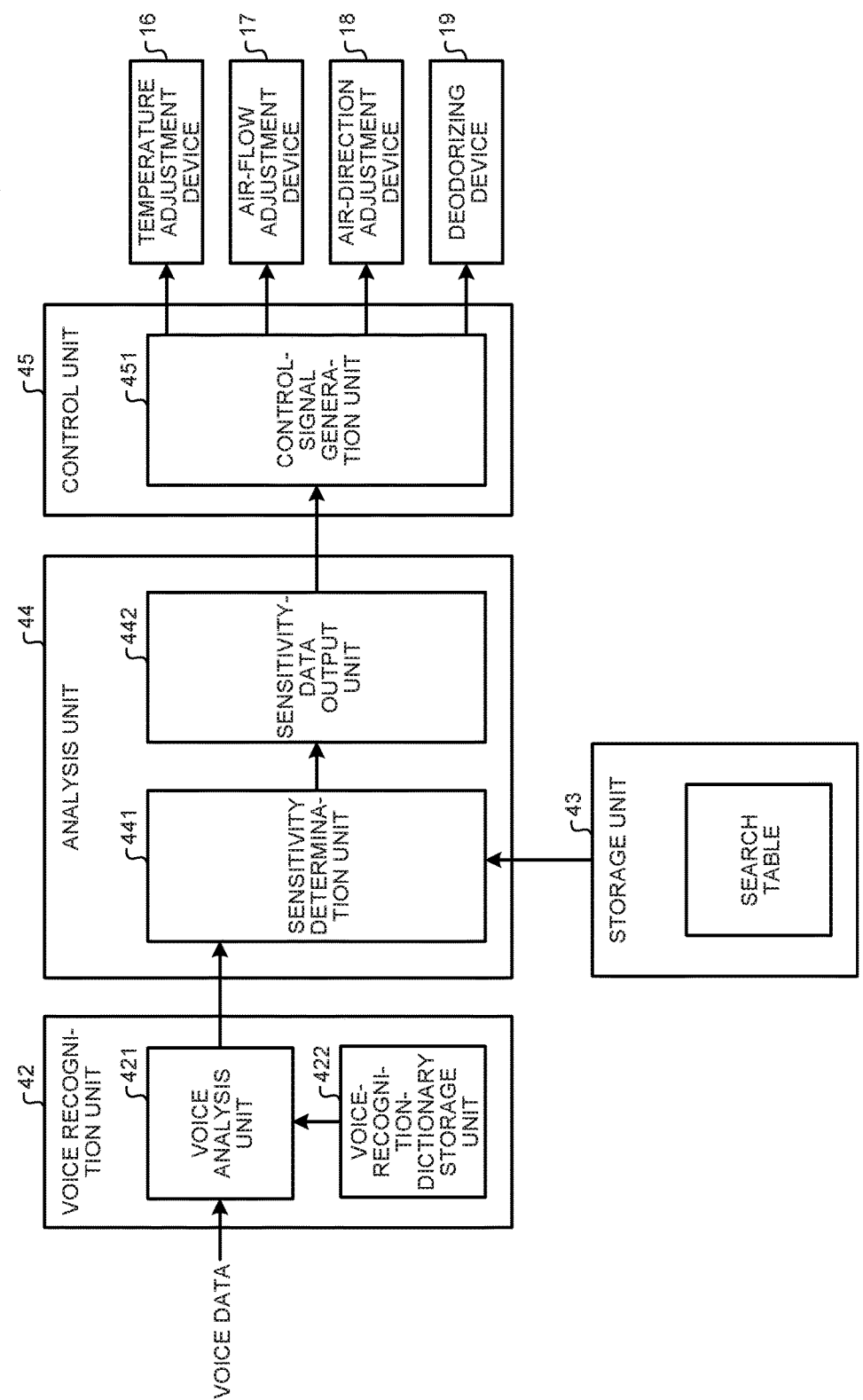

FIG.4

| FIRST STANDARD KEYWORD | ATSUI | LEVEL 1 |
|---|---|---|
| FIRST DERIVATIVE KEYWORD | ATSU | LEVEL 2 |
| | ATSU-UI | LEVEL 3 |
| | ATSUI, ATSUI | LEVEL 4 |
| | ATSUI ··· ATSUI | LEVEL 5 |
| SECOND STANDARD KEYWORD | SAMUI | LEVEL 1 |
| SECOND DERIVATIVE KEYWORD | SAMU | LEVEL 2 |
| | SAMU-UI | LEVEL 3 |
| | SAMUI, SAMUI | LEVEL 4 |
| | SAMUI ··· SAMUI | LEVEL 5 |
| THIRD STANDARD KEYWORD | KUSAI | LEVEL 1 |
| THIRD DERIVATIVE KEYWORD | KUSA | LEVEL 2 |
| | KUSA-AI | LEVEL 3 |
| | KUSAI, KUSAI | LEVEL 4 |
| | KUSAI ··· KUSAI | LEVEL 5 |

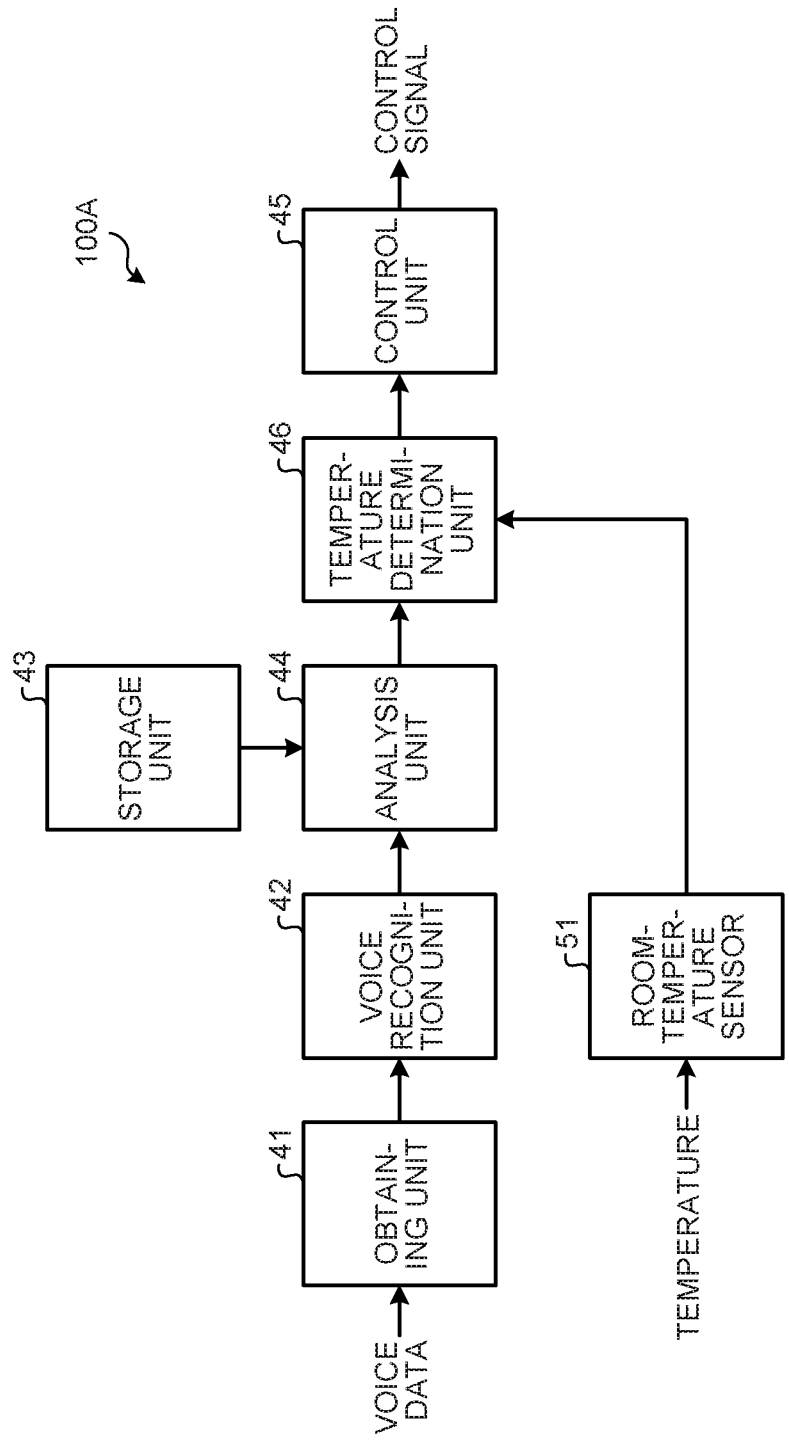

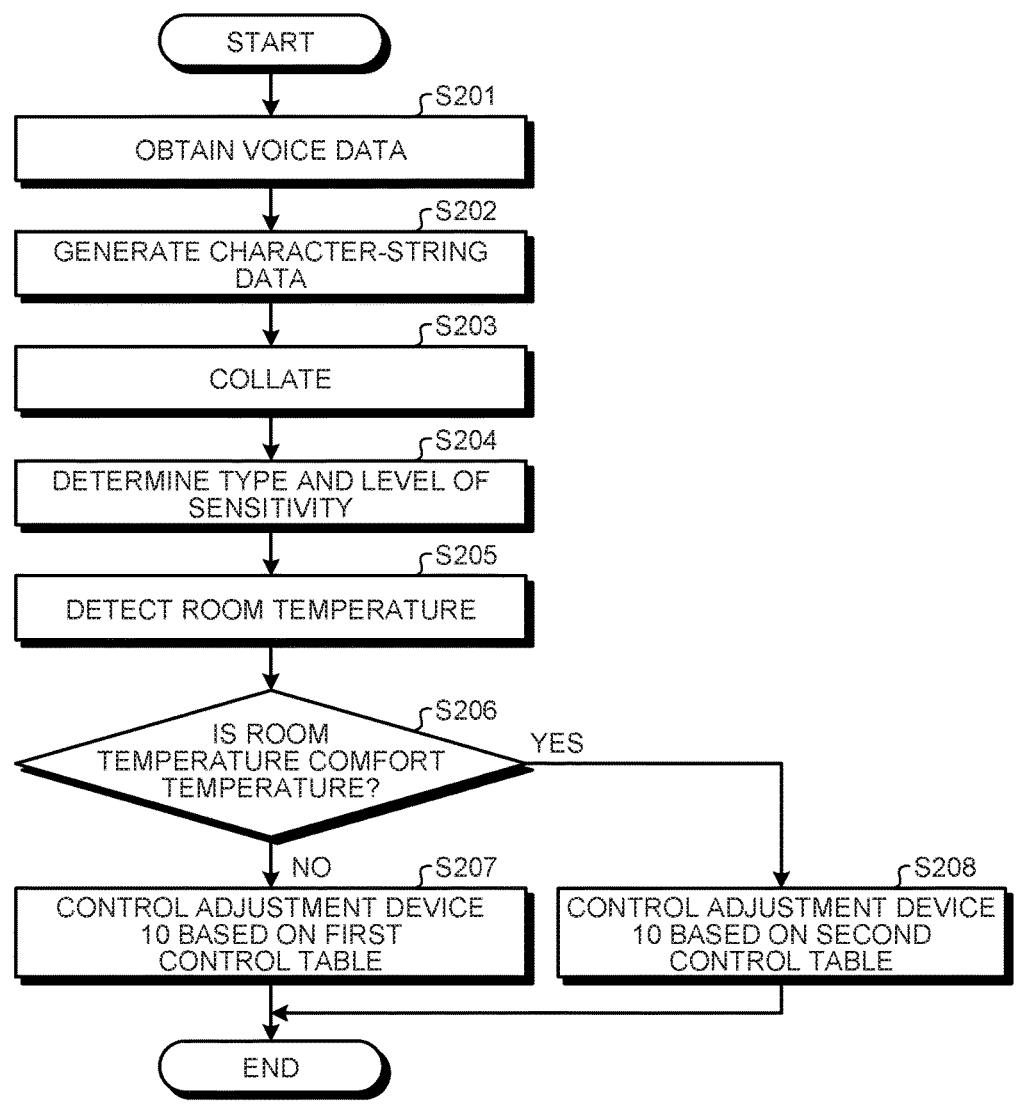

FIG.8

| | | | FIRST CONTROL TABLE | SECOND CONTROL TABLE |
|---|---|---|---|---|
| FIRST STANDARD KEYWORD | ATSUI | LEVEL 1 | A1 PATTERN | B1 PATTERN |
| FIRST DERIVATIVE KEYWORD | ATSU | LEVEL 2 | A2 PATTERN | B2 PATTERN |
| | ATSU-UI | LEVEL 3 | A3 PATTERN | B3 PATTERN |
| | ATSUI, ATSUI | LEVEL 4 | A4 PATTERN | B4 PATTERN |
| | ATSUI ⋯ ATSUI | LEVEL 5 | A5 PATTERN | B5 PATTERN |
| SECOND STANDARD KEYWORD | SAMUI | LEVEL 1 | A6 PATTERN | B6 PATTERN |
| SECOND DERIVATIVE KEYWORD | SAMU | LEVEL 2 | A7 PATTERN | B7 PATTERN |
| | SAMU-UI | LEVEL 3 | A8 PATTERN | B8 PATTERN |
| | SAMUI, SAMUI | LEVEL 4 | A9 PATTERN | B9 PATTERN |
| | SAMUI ⋯ SAMUI | LEVEL 5 | A10 PATTERN | B10 PATTERN |
| THIRD STANDARD KEYWORD | KUSAI | LEVEL 1 | A11 PATTERN | B11 PATTERN |
| THIRD DERIVATIVE KEYWORD | KUSA | LEVEL 2 | A12 PATTERN | B12 PATTERN |
| | KUSA-AI | LEVEL 3 | A13 PATTERN | B13 PATTERN |
| | KUSAI, KUSAI | LEVEL 4 | A14 PATTERN | B14 PATTERN |
| | KUSAI ⋯ KUSAI | LEVEL 5 | A15 PATTERN | B15 PATTERN |

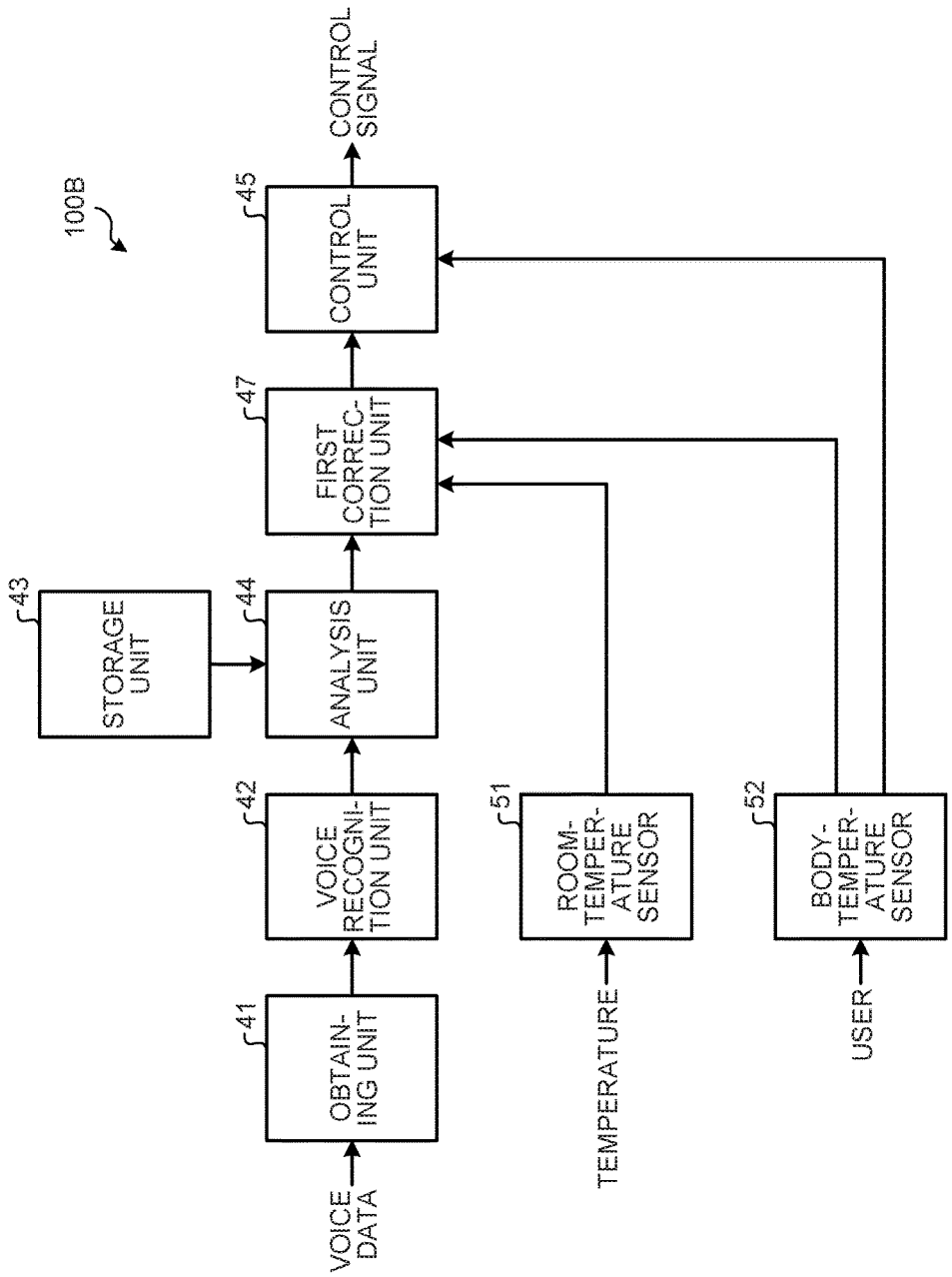

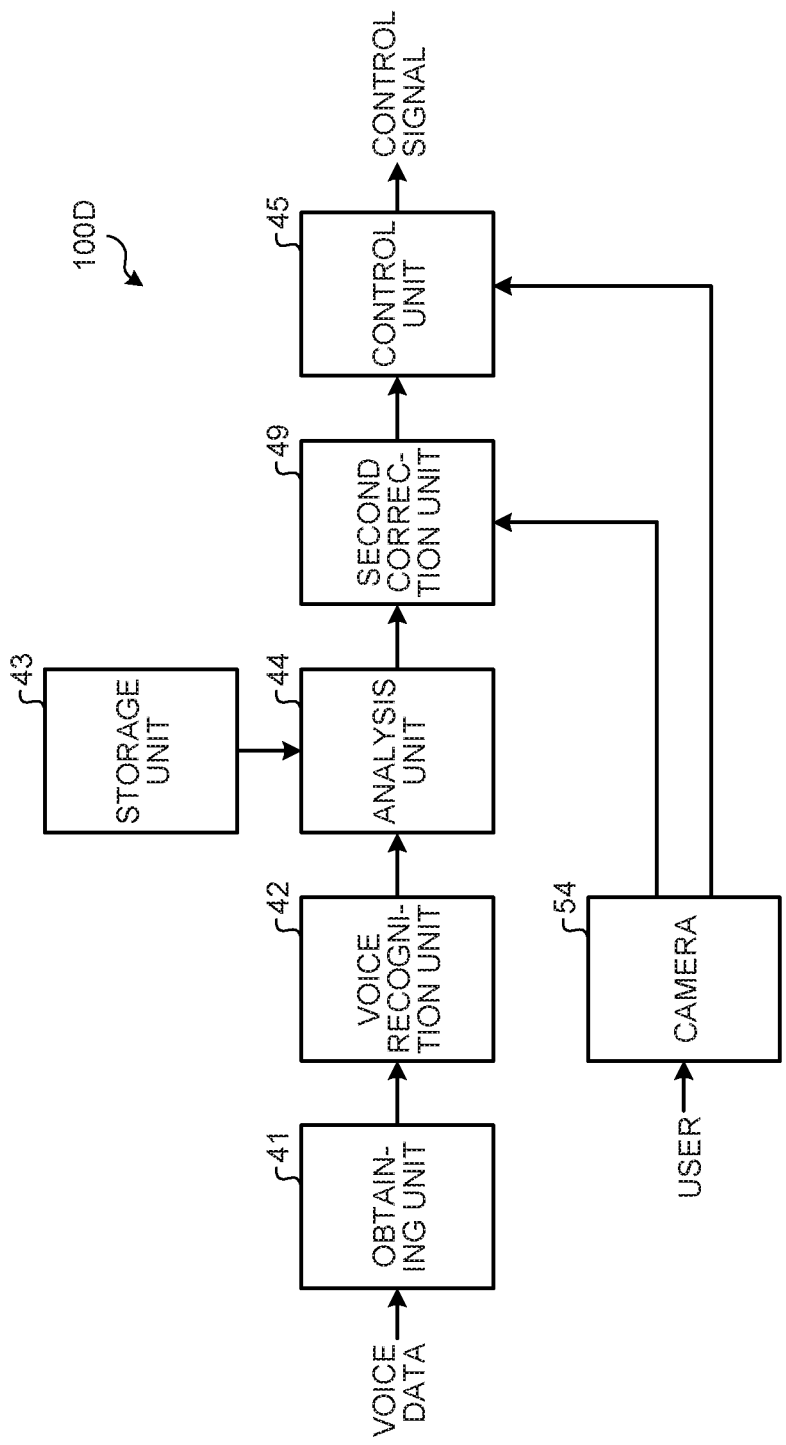

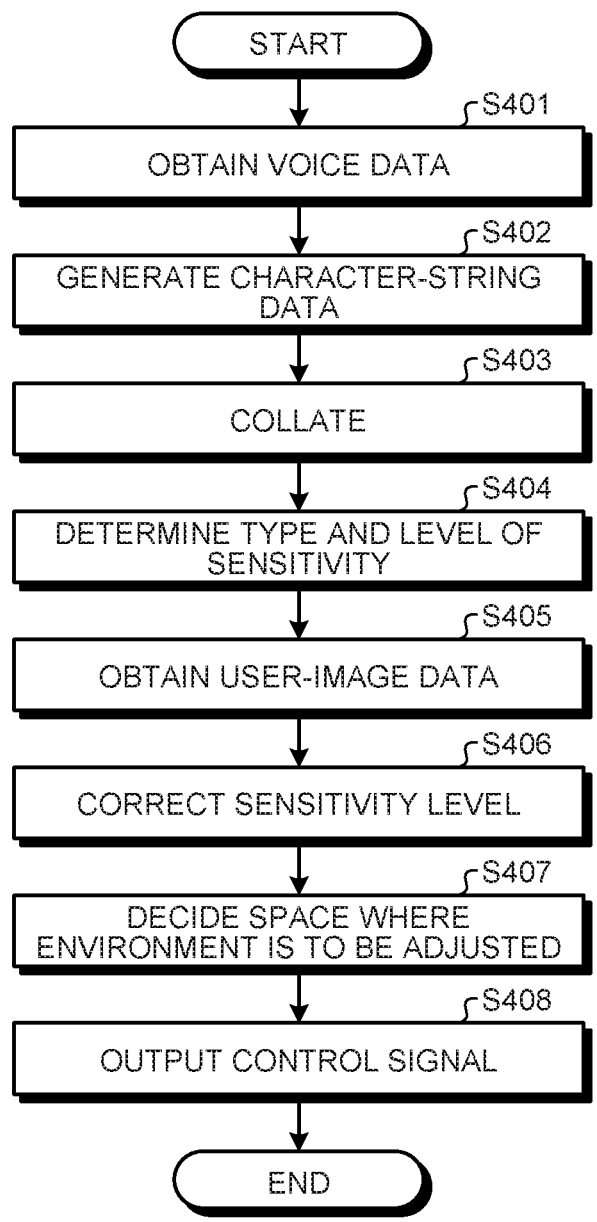

AIR CONDITIONING SYSTEM

CROSS REFERENCE TO RELATED APPLICATION

This application is a U.S. national stage application of PCT/JP2015/060668 filed on Apr. 3, 2015, the contents of which are incorporated herein by reference.

FIELD

The present invention relates to an air conditioning system provided with a voice recognition function.

BACKGROUND

An air conditioning system provided with a voice recognition function, as disclosed in Patent Literature 1, is known. Patent Literature 1 discloses a technology that, on the basis of emphasizers included in a character string input as speech, recognizes the level of sensitivity expressed by a user and then adjusts the environment of the room accordingly.

CITATION LIST

Patent Literature

Patent Literature 1: Japanese Patent Application Laid-open No. 2003-185221

SUMMARY

Technical Problem

In a case where there is a device that produces a verbal sound such as a television receiver or a personal computer inside a room, an emphasized word may be vocalized from these devices. When the emphasized word is vocalized from the device, an air conditioning system may erroneously recognize that emphasized word vocalized from the device as an emphasized word vocalized by a user. As a result of the erroneous recognition, the air conditioning system may operate to adjust the environment inside the room differently from a user's requested environment.

The present invention has been achieved to solve the above problems, and an objective of the present invention is to provide an air conditioning system that can recognize a user's sensitivity on the basis of the user's voice so as to be able to operate to adjust the environment inside a room to the user's requested environment.

Solution to Problem

In order to solve the problem and achieve the objective, the present invention relates to an air conditioning system that includes an obtaining unit that obtains user's voice data; a voice recognition unit that generates character-string data on the basis of the voice data; a storage unit that stores therein a search table having a standard keyword that indicates a type of sensitivity to an environment inside a room and derivative keywords that respectively indicate the same type of the sensitivity as the standard keyword while indicating different levels of the sensitivity; an analysis unit that determines a type and a level of the sensitivity of the user on the basis of the character-string data and the search table; and a control unit that outputs a control signal to an adjustment device in an indoor device, the adjustment device adjusting an environment inside the room on the basis of the type and level of the sensitivity determined by the analysis unit.

Advantageous Effects of Invention

According to the present invention, it is possible to adjust the environment inside a room to user's requested environment by recognizing a user's sensitivity.

BRIEF DESCRIPTION OF DRAWINGS

FIG. 3 is a block diagram illustrating an indoor device according to the first embodiment.
FIG. 4 is a diagram illustrating a search table according to the first embodiment.
FIG. 6 is a block diagram illustrating an air conditioning system according to a second embodiment.
FIG. 7 is a flowchart illustrating an operation of the air conditioning system according to the second embodiment.
FIG. 8 is a diagram illustrating a first control table and a second control table according to the second embodiment.
FIG. 9 is a block diagram illustrating an air conditioning system according to a third embodiment.
FIG. 12 is a block diagram illustrating an air conditioning system according to a fifth embodiment.
FIG. 13 is a flowchart illustrating an operation of the air conditioning system according to the fifth embodiment.

DESCRIPTION OF EMBODIMENTS

Exemplary embodiments of a control system according to the present invention will be explained below in detail with reference to the accompanying drawings. The present invention is not limited to the embodiments.

First Embodiment

Figure 1:
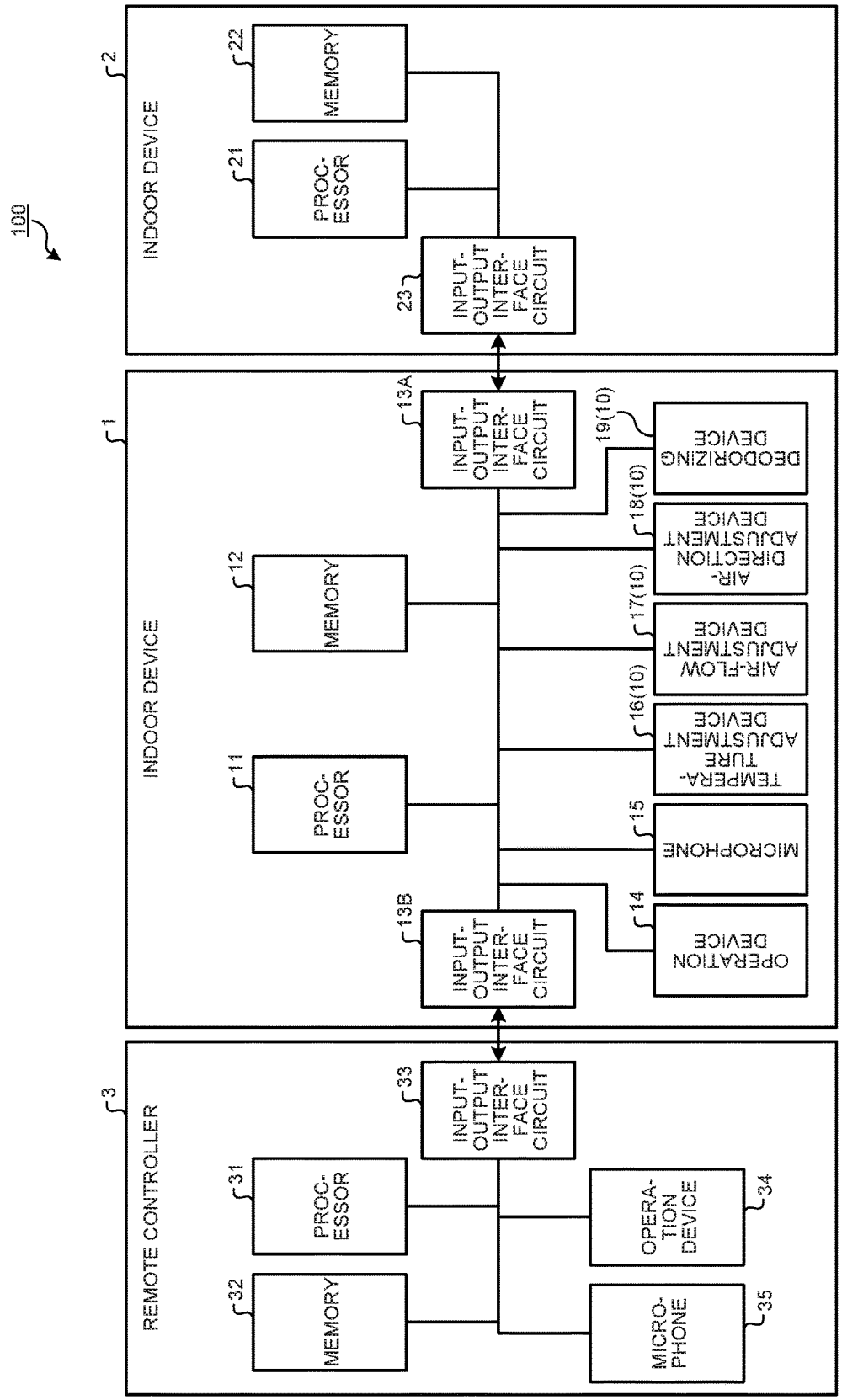
FIG. 1 is a diagram illustrating an air conditioning system according to a first embodiment.

FIG. 1 is a diagram illustrating an air conditioning system 100 according to a first embodiment. As illustrated in FIG. 1, the air conditioning system 100 includes an indoor device 1, an outdoor device 2 that is connected to the indoor device 1, and a remote controller 3 that remotely operates the indoor device 1.

The indoor device 1 includes a processor 11; a memory 12; an input-output interface circuit 13A that communicates data with the outdoor device 2; an input-output interface circuit 13B that communicates data with the remote controller 3; an operation device 14 that includes an operation switch or an operation button to be operated by the user; a microphone 15 to which the user's voice is input; and an adjustment device 10 that adjusts the environment inside a room. The adjustment device 10 includes a temperature adjustment device 16 that adjusts the temperature of air to be delivered to the inside of the room; an air-flow adjustment device 17 that adjusts the flow rate of air to be delivered to the inside of the room; an air-direction adjustment device 18 that adjusts the direction of air to be delivered to the inside of the room; and a deodorizing device 19 that is capable of deodorizing the inside of the room.

The outdoor device 2 includes a processor 21, a memory 22, and an input-output interface circuit 23 that communicates data with the indoor device 1.

The remote controller 3 includes a processor 31; a memory 32; an input-output interface circuit 33 that communicates data with the indoor device 1; an operation device 34 that includes an operation switch or an operation button operated by a user; and a microphone 35 to which the user's voice is input.

Figure 2:
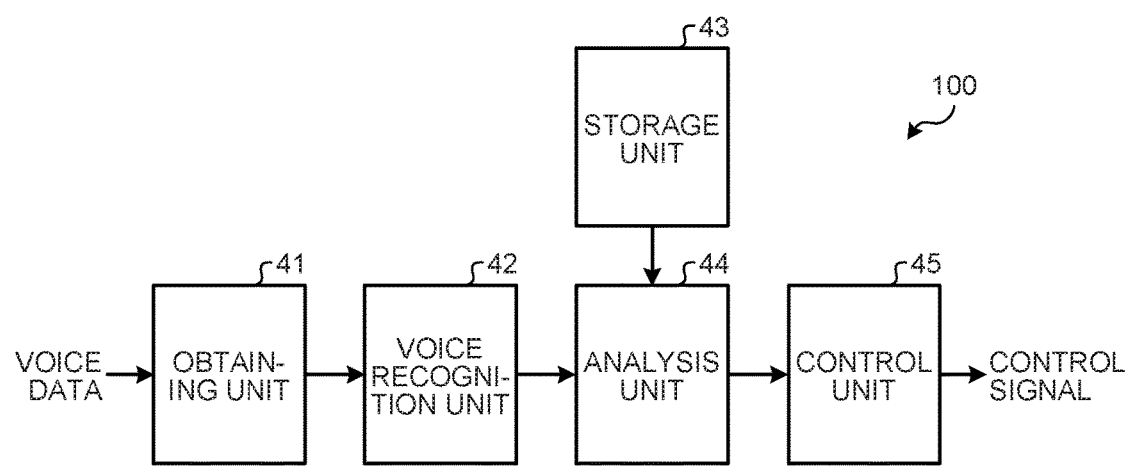
FIG. 2 is a block diagram illustrating the air conditioning system according to the first embodiment.

FIG. 2 is a block diagram illustrating the air conditioning system 100. FIG. 3 is a block diagram illustrating the indoor device 1. The air conditioning system 100 includes an obtaining unit 41 that obtains the user's voice data; a voice recognition unit 42 that generates character-string data on the basis of the voice data; a storage unit 43 that stores therein a search table having standard keywords that indicate aspects of the environment inside a room to which users are sensitive and derivative keywords related to the same aspect as the standard keyword that also indicate different levels of sensitivity that users have; an analysis unit 44 that determines the type of user's sensitivity and the sensitivity level on the basis of the character-string data and the search table; and a control unit 45 that outputs a control signal to the adjustment device 10 in the indoor device 1, the adjustment device 10 adjusting the environment inside the room on the basis of the type of sensitivity and the sensitivity level, which are determined by the analysis unit 44.

The obtaining unit 41 is provided in the remote controller 3. The voice recognition unit 42, the storage unit 43, the analysis unit 44, and the control unit 45 are provided in the indoor device 1. The obtaining unit 41 includes the microphone 35 provided in the remote controller 3. The processor 11 in the indoor device 1 includes the voice recognition unit 42, the analysis unit 44, and the control unit 45. The memory 12 in the indoor device 1 includes the storage unit 43.

The obtaining unit 41 obtains a user's voice data and sends the voice data to the voice recognition unit 42 in the indoor device 1. The input-output interface circuit 33 in the remote controller 3 and the input-output interface circuit 13B in the indoor device 1 can wirelessly communicate with each other. User's voice data obtained by the obtaining unit 41 in the remote controller 3 is transmitted wirelessly to the voice recognition unit 42.

The voice recognition unit 42 generates character-string data showing a character string that corresponds to the voice data obtained by the obtaining unit 41. The voice recognition unit 42 includes a voice analysis unit 421 and a voice-recognition-dictionary storage unit 422. Voice data from the obtaining unit 41 is supplied to the voice analysis unit 421. By using a dictionary stored in the voice-recognition-dictionary storage unit 422, the voice analysis unit 421 generates character-string data corresponding to the voice data and outputs the character-string data to the analysis unit 44.

The analysis unit 44 includes a sensitivity determination unit 441 that extracts a keyword indicating a user's sensitivity to the environment inside a room from the character-string data generated by the voice recognition unit 42 and that determines the type of user's sensitivity and the sensitivity level on the basis of the extracted keyword; and a sensitivity-data output unit 442 that outputs sensitivity data showing the type of user's sensitivity and the sensitivity level, which are determined by the sensitivity determination unit 441, to the control unit 45.

The sensitivity determination unit 441 collates the character-string data generated by the voice recognition unit 42 with the search table stored in the storage unit 43, and extracts a keyword indicating user's sensitivity to the environment inside the room. The keyword indicating user's sensitivity is registered in advance.

FIG. 4 is a diagram illustrating a search table stored in the storage unit 43. As a keyword indicating user's sensitivity to the environment inside a room, a plurality of standard keywords "atsui (hot)", "samui (cold)", and "kusai (smelly)" are registered. Further, as a derivative keyword derived from the standard keyword, a plurality of keywords are registered. As a derivative keyword derived from the standard keyword "atsui", "atsu (shortened pronunciation)", "atsu-ui (elongated pronunciation)", "atsui, atsui (repeated pronunciation)", and "atsui . . . atsui (again pronounced after a lapse of time" are registered. As a derivative keyword derived from the standard keyword "samui", "samu (shortened pronunciation)", "samu-ui (elongated pronunciation)", "samui, samui (repeated pronunciation)", and "samui . . . samui again pronounced after a lapse of time)" are registered. As a derivative keyword derived from the standard keyword "kusai", "kusa (shortened pronunciation)", "kusa-ai (elongated pronunciation)", "kusai, kusai (repeated pronunciation)", and "kusai . . . kusai again pronounced after a lapse of time)" are registered. "Atsu", "samu", and "kusa" are derivative keywords in which the ending of the standard keyword is not pronounced. "Atsu-ui", "samu-ui", and "kusa-ai" are derivative keywords in which a long sound is used in the standard keyword. "Atsui, atsui", "samui, samui", and "kusai, kusai" are derivative keywords in which the standard keywords are repeated twice or more. "Atsui . . . atsui", "samui . . . samui", and "kusai . . . kusai" are derivative keywords in which the standard keywords are pronounced and then are pronounced again after a lapse of some time.

The standard keyword and its derivative keywords have the same initial sound, which therefore indicate the same type of sensitivity. For example, the standard keyword "atsui", and the derivative keywords derived from this standard keyword, "atsu", "atsu-ui", "atsui, atsui", and "atsui . . . atsui" all have the same initial sound "a". Although there are differences in the sensitivity level between "atsui", "atsu", "atsu-ui", "atsui, atsui", and "atsui . . . atsui", these keywords all indicate the same type of sensitivity "atsui". The keywords "samui", "samu", "samu-ui", "samui, samui", and "samui . . . samui" all have the same initial sound "sa". Therefore, these keywords all indicate the same type of sensitivity "samui". The keywords "kusai", "kusa", "kusa-ai", "kusai, kusai", and "kusai . . . kusai" all have the same initial sound "ku". Therefore, these keywords all indicate the same type of sensitivity "kusai".

Keywords that indicate the same type of sensitivity are categorized into different sensitivity levels in advance. Level categorization is performed on the basis of a user's statistical data. "Atsui" is categorized into five levels. For example, in a condition where a user pronounces "atsui", in many cases, the user feels "yaya atsui (it is slightly hot)" and "yaya sagetai (desires to slightly decrease)" the temperature inside a room. In a condition where a user pronounces "atsu", in many cases, the user feels "sukoshi atsui (it is a little hot)" and "sukoshi sagetai (desires to decrease a little bit)" the temperature inside a room. In a condition where a user pronounces "atsu-ui", in many cases, the user feels "kanari atsui (it is quite hot)" and "kanari sagetai (desires to substantially decrease)" the temperature inside a room. In a condition where a user pronounces "atsui, atsui", in many cases, the user feels "totemo atsui (it is very hot)" and "totemo sagetai (desires to greatly decrease)" the temperature inside a room. In a condition where a user pronounces "atsui . . . atsui", in many cases, the user feels "hijohni atsui (it is extremely hot)" and "hijohni sagetai (desires to significantly decrease)" the temperature inside a room.

Similarly, "samui" and "kusai" are also categorized into five levels, respectively.

Note that the sensitivity level categorization is merely an example. A character string that is used as the basis of the level categorization is set appropriately according to the basis of a user's statistical data.

In the following descriptions, the user's sensitivity level 5 indicates a sensitivity level at which a user desires to change the environment inside a room most significantly. Similarly, the user's sensitivity level 4 indicates a sensitivity level at which a user desires to change the environment inside a room less significantly than the level 5. The user's sensitivity level 3 indicates a sensitivity level at which a user desires to change the environment inside a room less significantly than the level 4. The user's sensitivity level 2 indicates a sensitivity level at which a user desires to change the environment inside a room less significantly than the level 3. The user's sensitivity level 1 indicates a sensitivity level at which a user desires to change the environment inside a room less significantly than the level 2.

The number of types of sensitivity registered in advance is not limited to three, and can be one or two, or can be four or more. The sensitivity levels registered in advance may not be categorized into five levels, but may be categorized into two, three, or four levels, or into six or more levels.

The sensitivity determination unit 441 collates character-string data generated in the voice recognition unit 42 with a search table stored in the storage unit 43, and identifies a keyword that is closest to the character-string data. For example, when the character-string data is determined to be "atsui . . . atsui", the sensitivity determination unit 441 determines that the type of user's sensitivity is "atsui", and the sensitivity level is "level 5".

When the sensitivity determination unit 441 determines that the type of user's sensitivity is "atsui", and the sensitivity level is "level 5", the sensitivity-data output unit 442 outputs sensitivity data to the control unit 45. This output sensitivity data indicates that the type of user's sensitivity is "atsui" and the sensitivity level is "level 5".

The control unit 45 includes a control-signal generation unit 451 that generates a control signal to be output to the adjustment device 10. On the basis of the type of a user's sensitivity and the sensitivity level determined by the analysis unit 44, the control unit 45 outputs a control signal to at least one of the temperature adjustment device 16, the air-flow adjustment device 17, the air-direction adjustment device 18, and the deodorizing device 19, each of which is one of the adjustment devices 10 in the indoor device 1, in order to adjust the environment inside a room to user's requested environment.

Figure 5:
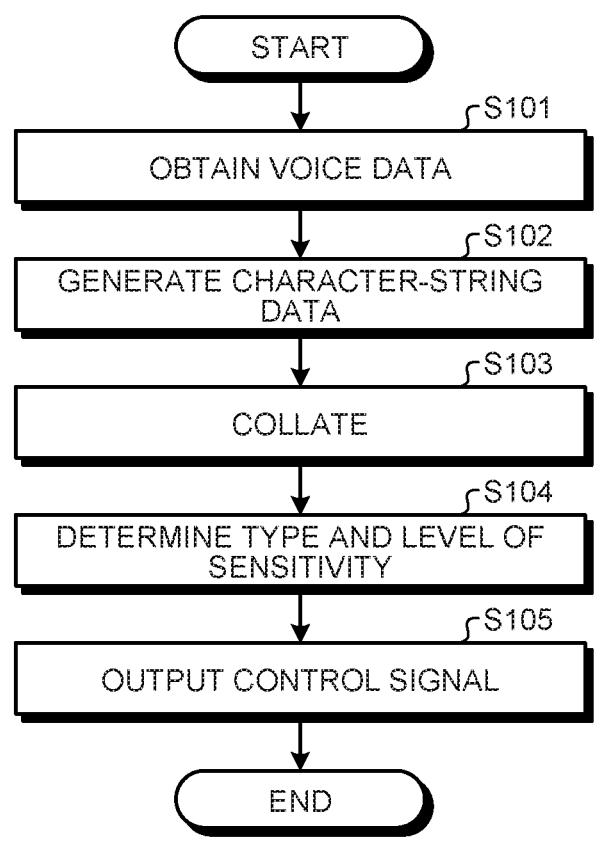
FIG. 5 is a flowchart illustrating an operation of the air conditioning system according to the first embodiment.

Next, an operation of the air conditioning system 100 is described. FIG. 5 is a flowchart illustrating the operation of the air conditioning system 100. When a user speaks (emits a voice), the obtaining unit 41 obtains the user's voice data (Step S101). The voice data is transmitted to the voice recognition unit 42. The voice recognition unit 42 recognizes the voice data and generates character-string data on the basis of the voice data (Step S102).

The character-string data is transmitted to the analysis unit 44. The analysis unit 44 collates the character-string data with a search table (Step S103). On the basis of the character-string data and the search table, the analysis unit 44 determines the type and level of the user's sensitivity (Step S104).

On the basis of the type of user's sensitivity and the sensitivity level which are determined by the analysis unit 44, the control unit 45 outputs a control signal to at least one of the temperature adjustment device 16, the air-flow adjustment device 17, the air-direction adjustment device 18, and the deodorizing device 19, each of which is the adjustment device 10 that adjusts the environment inside a room (Step S105). For example, when the type of user's sensitivity is "atsui" and the sensitivity level is "level 5", the control unit 45 outputs a control signal to the temperature adjustment device 16 and the air-flow adjustment device 17 to set the indoor device 1 to a quick cooling mode.

When the type of user's sensitivity is "kusai", and the sensitivity level is "level 3", the control unit 45 outputs a control signal to the deodorizing device 19 to set the indoor device 1 to a deodorizing mode.

As described above, according to the first embodiment, a search table including a standard keyword that indicates the type of sensitivity and derivative keywords that indicate the same type of sensitivity as the standard keyword while also indicating different sensitivity levels is used to determine the type of sensitivity and the sensitivity level on the basis of voice data spoken (pronounced) by a user. Therefore, it is possible to prevent voice recognition processing from becoming more complicated; recognize user's sensitivity on the basis of the voice data; and adjust the environment inside a room to user's requested environment.

The standard keyword and its derivative keywords have the same initial sound. Therefore, it is easy to categorize the types of sensitivity and the number of registered keywords can be minimized.

Further, emphasized words, which include adverbs or exclamations such as "kanari (pretty)", "sugoku (very)", "totemo (much)", "mecha-kucha (extraordinary)", "mecha (much)", and "choh (very)", are not used for determination of a user's sensitivity. Even when there is a device that produces a sound inside a room and an emphasized word is vocalized from the device, the emphasized word is not used for determination of a user's sensitivity. Therefore, the air conditioning system 100 can adjust the environment inside a room to a user's requested environment.

Furthermore, the obtaining unit 41 that obtains a user's voice is provided in the remote controller 3. This can reduce the distance between the user and the obtaining unit 41. Therefore, even when the user's voice volume is low, the obtaining unit 41 can still obtain voice data.

Second Embodiment

FIG. 6 is a block diagram illustrating an air conditioning system 100A according to a second embodiment. The air conditioning system 100A has a configuration in which the air conditioning system 100 of the first embodiment is further provided with a room-temperature sensor 51 that detects the temperature inside a room and is further provided with a temperature determination unit 46 that determines whether the temperature inside the room is a predetermined comfortable temperature on the basis of the detection result from the room-temperature sensor 51. The processor 11 in the indoor device 1 includes the temperature determination unit 46. The room-temperature sensor 51 is provided in the indoor device 1.

FIG. 7 is a flowchart illustrating an operation of the air conditioning system 100A. The obtaining unit 41 obtains a user's voice data (Step S201). The voice recognition unit 42 generates character-string data on the basis of the voice data (Step S202). The analysis unit 44 collates the character-string data with a search table stored in the storage unit 43 (Step S203). On the basis of the character-string data and the search table, the analysis unit 44 determines the type and level of a user's sensitivity (Step S204).

The room-temperature sensor 51 detects the room temperature (Step S205). A detection result from the room-temperature sensor 51 is output to the temperature determination unit 46. On the basis of the detection result from the room-temperature sensor 51, the temperature determination unit 46 determines whether the temperature inside the room is a predetermined comfortable temperature (Step S206). The comfortable temperature is equal to or higher than 22[° C.] and equal to or lower than 26[° C.].

When the temperature determination unit 46 determines that the temperature inside the room is not a comfortable temperature (NO at Step S206), the control unit 45 controls the adjustment device 10 according to a first control table that represents a relation between the type and level of sensitivity and a control signal for controlling the adjustment device 10 (Step S207). When the temperature determination unit 46 determines that the temperature inside the room is a comfortable temperature (YES at Step S206), the control unit 45 controls the adjustment device 10 according to a second control table that is different from the first control table (Step S208).

FIG. 8 is a diagram illustrating the first control table and the second control table that are stored in the storage unit 43. Each of the first control table and the second control table represents a relation between the type and level of sensitivity and an output pattern of a control signal to be output to at least one of the temperature adjustment device 16, the air-flow adjustment device 17, the air-direction adjustment device 18, and the deodorizing device 19, each of which is one the adjustment devices 10 in the indoor device 1. For example, when the temperature inside a room is not a comfortable temperature, the type of sensitivity is "atsui", and the sensitivity level is "level 5", then the control unit 45 outputs a control signal in a predetermined A5 pattern. If the temperature inside the room is a comfortable temperature, the type of sensitivity is "atsui", and the sensitivity level is "level 5", then the control unit 45 outputs a control signal in a B5 pattern that is different from the A5 pattern.

When a user emits a voice "atsui . . . atsui" expressing uncomfortableness while the temperature determination unit 46 determines that the room temperature is not a comfortable temperature, then the control unit 45 determines that the reason of the voice expressing uncomfortableness is because the room temperature is not a comfortable temperature and outputs a control signal in the A5 pattern. The A5 pattern is an output pattern of a control signal for adjusting the room temperature to a comfort temperature.

When a user emits a voice "atsui . . . atsui" expressing uncomfortableness while the temperature determination unit 46 determines that the room temperature is a comfortable temperature, then the control unit 45 determines that the reason of the voice expressing uncomfortableness is because of the user's condition, and outputs a control signal in the B5 pattern. For example, in a state where the user's body temperature temporarily rises after exercising or taking a bath, the user may emit a voice "atsui . . . atsui" expressing uncomfortableness even though the room temperature is a comfortable temperature. The B5 pattern is an output pattern for a control signal for quickly cooling the room only for a short time.

The same occurs in a case where a user emits a voice "samui . . . samui" expressing uncomfortableness. When a user emits a voice "samui . . . samui" expressing uncomfortableness while the temperature determination unit 46 determines that the room temperature is a comfortable temperature, then the control unit 45 determines that the reason of the voice expressing uncomfortableness is because of the user's condition, and outputs a control signal in a B10 pattern. For example, immediately after coming back home in winter, a user may emit a voice "samui . . . samui" expressing uncomfortableness even though the room temperature is a comfortable temperature. The B10 pattern is an output pattern of a control signal for quickly heating the room only for a short time.

As described above, according to the second embodiment, a pattern for controlling the adjustment device 10 is selected on the basis of a detection result from the room-temperature sensor 51 whether the room temperature is a comfortable temperature is determined, and on the basis of a determination result. Therefore the environment inside a room can be adjusted to a comfortable environment according to an assumed condition of a user.

Third Embodiment

FIG. 9 is a block diagram illustrating an air conditioning system 100B according to a third embodiment. The air conditioning system 100B has a configuration in which the air conditioning system 100 of the first embodiment is further provided with the room-temperature sensor 51 that detects the temperature inside a room; a body-temperature sensor 52 that detects the user's body temperature; and a first correction unit 47 that corrects a sensitivity level determined by the analysis unit 44 on the basis of the detection results from the room-temperature sensor 51 and the body-temperature sensor 52. The processor 11 in the indoor device 1 includes the first correction unit 47. The room-temperature sensor 51 is provided in the indoor device 1. The body-temperature sensor 52 is a noncontact body-temperature sensor that includes a thermopile provided in the indoor device 1 and that detects the user's body temperature in a noncontact manner. The body-temperature sensor 52 includes the thermopile functions as a human sensor that detects the position of a user relative to the indoor device 1 inside a room. The control unit 45 controls the adjustment device 10 on the basis of the type of sensitivity determined by the analysis unit 44 and on the basis of the sensitivity level corrected by the first correction unit 47.

Figure 10:
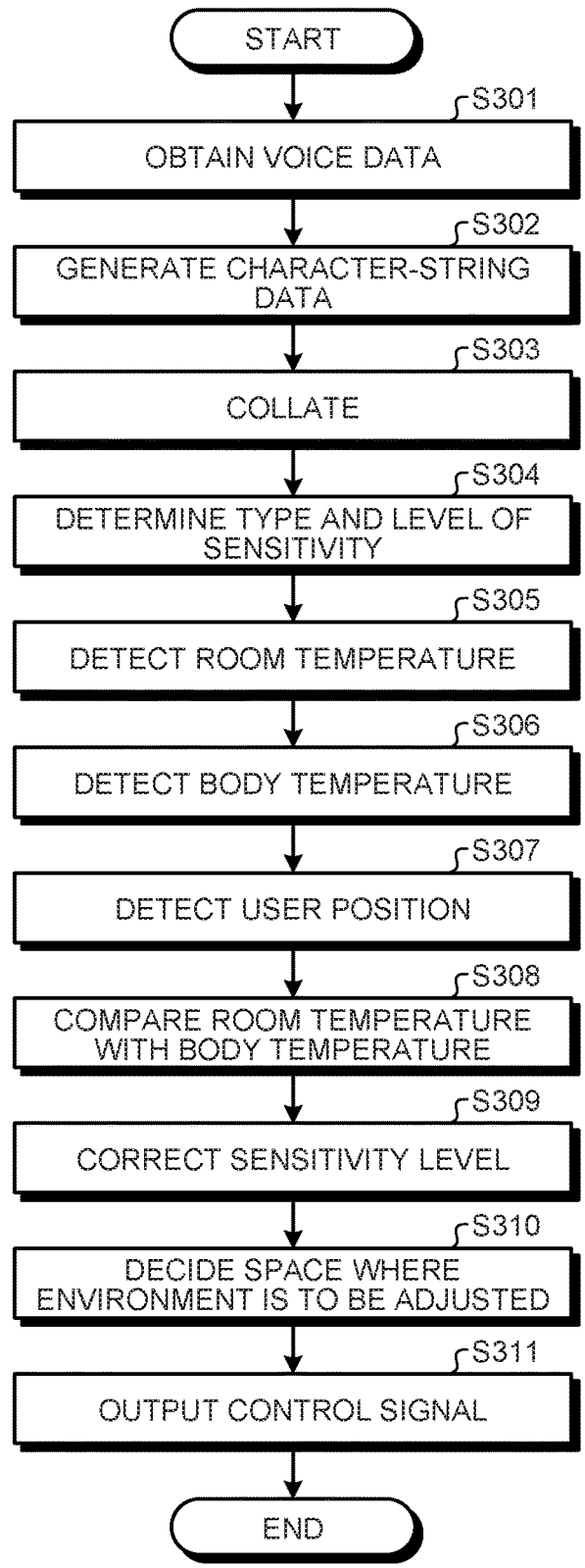
FIG. 10 is a flowchart illustrating an operation of the air conditioning system according to the third embodiment.

FIG. 10 is a flowchart illustrating an operation of the air conditioning system 100B. The obtaining unit 41 obtains voice data (Step S301). The voice recognition unit 42 generates character-string data (Step S302). The analysis unit 44 collates the character-string data with a search table (Step S303) and determines the type and level of user's sensitivity on the basis of the character-string data and the search table (Step S304).

The room-temperature sensor 51 detects the room temperature (Step S305). The body-temperature sensor 52 detects the user's body temperature (Step S306). The body-temperature sensor 52 detects the position of a user inside a room (Step S307).

Detection results from the room-temperature sensor 51 and the body-temperature sensor 52 are output to the first correction unit 47. The first correction unit 47 obtains room-temperature data showing the room temperature from the room-temperature sensor 51 and obtains body-temperature data showing the user's body temperature from the room-temperature sensor 51. The first correction unit 47 compares the room temperature with the body temperature (Step S308).

The first correction unit 47 corrects the sensitivity level determined by the analysis unit 44 on the basis of the detection results from the room-temperature sensor 51 and the body-temperature sensor 52 (Step S309).

When there is a significant difference between the room temperature and the body temperature, the first correction unit 47 determines that the sensitivity level is higher. When the difference between the room temperature and the body temperature is equal to or greater than a first threshold and less than a second threshold, the first correction unit 47 changes the sensitivity level output from the analysis unit 44 by one level. When the difference between the room temperature and the body temperature is equal to or greater than the second threshold, the first correction unit 47 changes the sensitivity level output from the analysis unit 44 by two levels. The first threshold and the second threshold are predetermined values.

For example, given that a user emits a voice "atsu-ui" and then the analysis unit 44 determines that the type of sensitivity is "atsui" and that the sensitivity level is "level 3". In this case, when the body temperature is higher relative to the room temperature within a range between equal to or greater than the first threshold and less than the second threshold, the first correction unit 47 determines that the user's sensitivity level is "level 4" although the user has emitted a voice "atsu-ui", and then it corrects the sensitivity level from "level 3" to "level 4". In a case where the body temperature is higher relative to the room temperature by equal to or greater than the second threshold, the first correction unit 47 determines that the user's sensitivity level is "level 5" although the user has emitted a voice "atsu-ui", and then it corrects the sensitivity level from "level 3" to "level 5".

The detection result from the body-temperature sensor 52 is output to the control unit 45. The control unit 45 identifies the user position inside a room on the basis of the detection result from the body-temperature sensor 52, and it determines the space where the environment is to be adjusted inside the room (Step S310).

The control unit 45 outputs a control signal for controlling the adjustment device 10 on the basis of the type of sensitivity determined by the analysis unit 44, and it corrected by the first correction unit 47 on the basis of the sensitivity level (Step S311).

For example, with reference to the first control table illustrated in FIG. 8, in a case where the analysis unit 44 determines that the type of sensitivity is "atsui" and that the sensitivity level is "level 3", when the body temperature is higher relative to the room temperature within the range where the difference is equal to or greater than the first threshold and less than the second threshold, the control unit 45 outputs a control signal not in an A3 pattern but in an A4 pattern.

The control unit 45 outputs a control signal for locally adjusting the environment in the space determined at Step S310. The control unit 45 outputs a control signal to the air-direction adjustment device 18 to adjust the direction of air to be delivered to the inside of the room. On the basis of the control signal, the air-direction adjustment device 18 delivers air to the determined space to execute spot air-conditioning control.

As described above, according to the third embodiment, because the user's body temperature is detected and then the sensitivity level is corrected, the sensitivity-level estimation accuracy can be improved.

Further, the position of a user is identified so as to determine the space where spot air-conditioning control is to be executed inside a room. Therefore, even when there are two or more persons inside the room, a space for a target user can be made comfortable. Further, by executing the spot air-conditioning control, energy consumption can be reduced.

Fourth Embodiment

Figure 11:
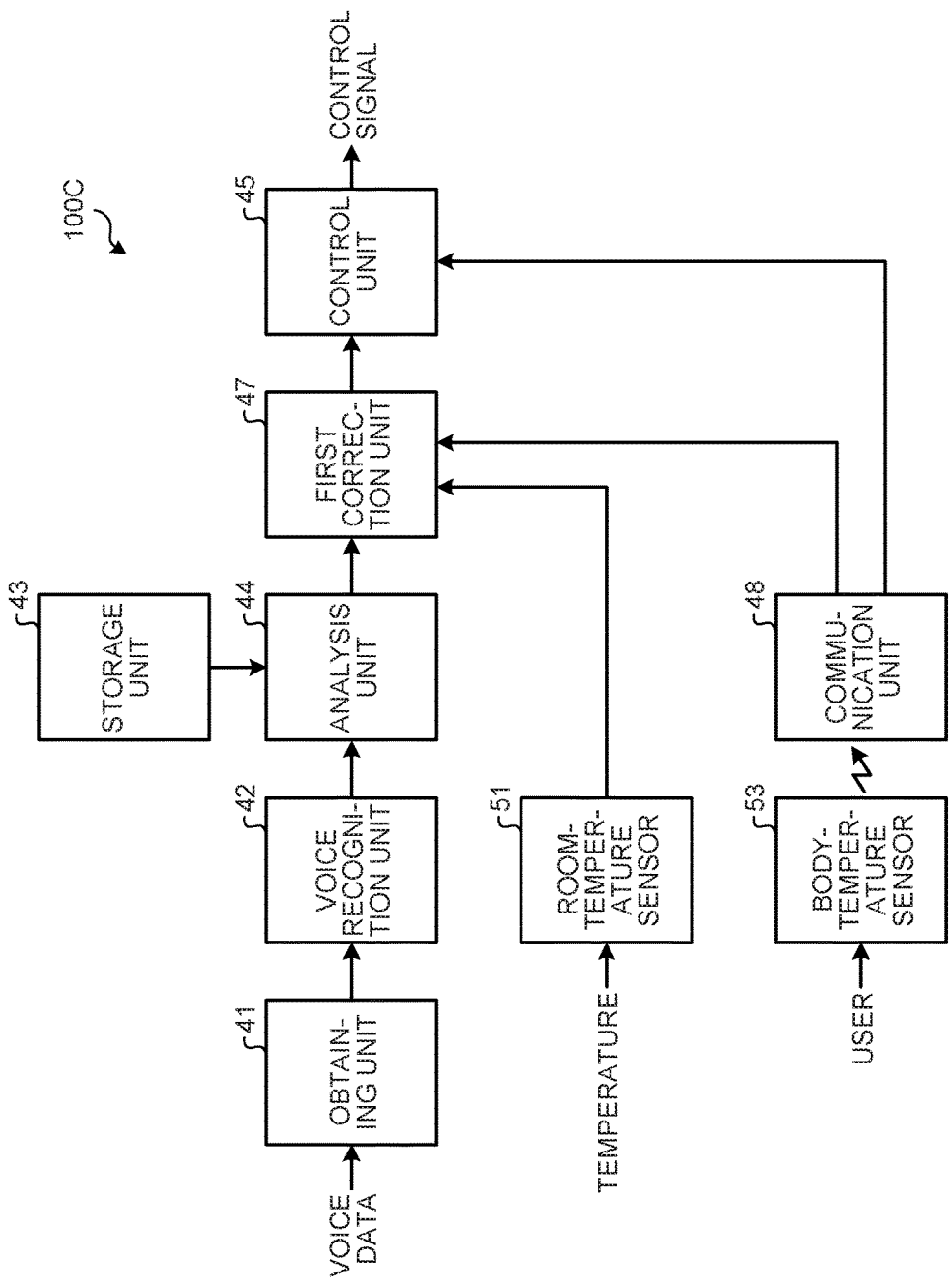
FIG. 11 is a block diagram illustrating an air conditioning system according to a fourth embodiment.

FIG. 11 is a block diagram illustrating an air conditioning system 100C according to a fourth embodiment. The air-conditioning system 100C has a configuration in which the air conditioning system 100B of the third embodiment uses a body-temperature sensor 53 that is provided on a user, which is as a body-temperature sensor that detects the user's body temperature. The body-temperature sensor 53 is a contact body-temperature sensor that is in contact with a user.

The indoor device 1 includes a communication unit 48 that wirelessly communicates with the body-temperature sensor 53. The body-temperature sensor 53 wirelessly transmits body-temperature data indicating the user's body temperature to the communication unit 48. The body-temperature sensor 53 is in contact with a user and wirelessly transmits position data indicating the user position to the communication unit 48. By using a global positioning system, the body-temperature sensor 53 transmits the user-position data to the communication unit 48.

The user's body-temperature data obtained by the communication unit 48 is output to the first correction unit 47. The first correction unit 47 corrects the sensitivity level determined by the analysis unit 44 on the basis of the detection results from the room-temperature sensor 51 and the body-temperature sensor 53. The control unit 45 controls the adjustment device 10 on the basis of the type of sensitivity determined by the analysis unit 44 and on the basis of the sensitivity level corrected by the first correction unit 47.

The user-position data obtained by the communication unit 48 is output to the control unit 45. On the basis of the detection result from the body-temperature sensor 53 received by the communication unit 48, the control unit 45 identifies the user position inside a room, determines the space where the environment is to be adjusted, and then executes spot air-conditioning control.

As described above, according to the fourth embodiment, by using the body-temperature sensor 53 that is in contact with a user, the user's body temperature and position can be detected accurately. Due to this configuration, the air conditioning system 100C can execute comfort-air-conditioning control.

Fifth Embodiment

FIG. 12 is a block diagram illustrating an air conditioning system 100D according to a fifth embodiment. The air conditioning system 100D includes the obtaining unit 41, the voice recognition unit 42, the storage unit 43, the analysis unit 44, and the control unit 45. The air conditioning system 100D includes a camera 54 that obtains user-image data, and a second correction unit 49 that corrects the sensitivity level determined by the analysis unit 44 on the basis of the image data obtained by the camera 54. The processor 11 in the indoor device 1 includes the second correction unit 49. The camera 54 is provided in the indoor device 1.

User-image data obtained by the camera 54 is output to the second correction unit 49. The second correction unit 49 can process the image data and can detect the user position relative to the indoor device 1 inside a room. Further, the second correction unit 49 can process the image data and detect the user's motion.

The second correction unit 49 holds a motion-pattern table that represents a relation between the type and level of user's sensitivity and a motion pattern shown by the user. When a user feels that it is cold, a motion pattern shown by the user can be acquired from statistical data. Further, a motion pattern that corresponds to the level of how cold a user feels can be acquired from the statistical data. For example, the user's motion pattern differs between a case where the user feels that it is cold at level 1 and a case where the user feels that it is cold at level 5. The same is in the cases when a user feels that it is hot and when a user feels that it smells bad.

The second correction unit 49 collates the user's motion pattern derived from the user-image data obtained by the camera 54 with the motion-pattern table, and it acquires the type and level of user's sensitivity from the image data.

FIG. 13 is a flowchart illustrating an operation of the air conditioning system 100D. The obtaining unit 41 obtains voice data (Step S401). The voice recognition unit 42 generates character-string data (Step S402). The analysis unit 44 collates the character-string data with a search table (Step S403), and it determines the type and level of user's sensitivity on the basis of the character-string data and the search table (Step S404).

The camera 54 obtains user-image data (Step S405). The image data obtained by the camera 54 is output to the second correction unit 49.

The second correction unit 49 obtains the user-image data. On the basis of the image data and the motion-pattern table, the second correction unit 49 corrects the sensitivity level determined by the analysis unit 44 (Step S406).

For example, in a case where a user emits a voice "samu-ui" and then the analysis unit 44 determines that the type of user's sensitivity is "samui", the sensitivity level is "level 3". In this case, when the user's sensitivity level is determined to be "level 4" on the basis of the image data and the motion-pattern table, then the second correction unit 49 corrects the sensitivity level from "level 3" to "level 4".

The image data obtained by the camera 54 is output to the control unit 45. The control unit 45 identifies the user position inside a room on the basis of the image data obtained by the camera 54, and it determines the space where the environment is to be adjusted inside the room (Step S407).

The control unit 45 outputs a control signal for controlling the adjustment device 10 on the basis of the type of sensitivity determined by the analysis unit 44 and on the basis of the sensitivity level corrected by the second correction unit 49 (Step S408).

The control unit 45 outputs a control signal for locally adjusting the environment in the space determined at Step S407. On the basis of the control signal, the air-direction adjustment device 18 sends air to the determined space so as to execute spot air-conditioning control.

As described above, according to the fifth embodiment, by detecting the user's motion by using the camera 54, the type and level of user's sensitivity expressed by the user's motion can be acquired. With this configuration, the user's sensitivity can be identified accurately and it can be improved in the comfort-air-conditioning control.

Further, the position of a user can be identified on the basis of image data obtained by the camera 54 to determine the space where spot air-conditioning control is to be executed inside a room. Therefore, even when there are two or more persons inside a room, a space comfortable for a target user can be suitably created. Furthermore, by executing the spot air-conditioning control, energy consumption can be reduced.

The obtaining unit 41 that obtains user's voice data may include the microphone 15 provided in the indoor device 1. Further, the processor 31 in the remote controller 3 may include the voice recognition unit 42, the storage unit 43, and the analysis unit 44. Furthermore, the sensitivity data indicating the type and level of user's sensitivity, which are determined by the analysis unit 44 in the remote controller 3, may be wirelessly transmitted to the control unit 45 in the indoor device 1.

The configuration described in the above embodiment is only an example of the contents of the present invention. The configuration can be combined with other known techniques and can be modified, or a part of the configuration can be omitted without departing from the scope of the invention.

REFERENCE SIGNS LIST 1 indoor device, 2 outdoor device, 3 remote controller, 10 adjustment device, 11 processor, 12 memory, 13A input-output interface circuit, 13B input-output interface circuit, 14 operation device, 15 microphone, 16 temperature adjustment device, 17 air-flow adjustment device, 18 air-direction adjustment device, 19 deodorizing device, 21 processor, 22 memory, 23 input-output interface circuit, 31 processor, 32 memory, 33 input-output interface circuit, 34 operation device, 35 microphone, 41 obtaining unit, 42 voice recognition unit, storage unit, 44 analysis unit, 45 control unit, 46 temperature determination unit, 47 first correction unit, communication unit, 49 second correction unit, 51 room-temperature sensor, 52 body-temperature sensor, 53 body-temperature sensor, 54 camera, 421 voice analysis unit, 422 voice-recognition-dictionary storage unit, 441 sensitivity determination unit, 442 sensitivity-data output unit, 100, 100A, 100B, 100C, 100D air conditioning system.

The invention claimed is:
1. An air conditioning system comprising:
a collector to obtain a voice data of a user;
a voice recognizer to generate character-string data on the basis of the voice data;
a memory to store therein a search table having a
 standard keyword that indicates a type of sensitivity to an environment inside a room and
 derivative keywords, each of the derivative keywords respectively indicates the same type of the sensitivity as the standard keyword while indicating a different levels of the sensitivity;
an analyzer to determine, using the search table, a type of the sensitivity felt by the user and a level of the sensitivity lion felt by the user on the basis of the character-string data and the search table; and
a controller to output a control signal to an adjustment device in an indoor device, the adjustment device adjusting an environment inside the room on the basis of the type of the sensitivity determined by the analyzer and the level of the sensitivity determined by the analyzer;
a room-temperature sensor to detect a temperature inside the room; and a temperature determiner to determine whether the room is at a predetermined comfortable temperature on the basis of a detection result from the room-temperature sensor, wherein when the temperature determiner determines that the room is not at the comfortable temperature, the controller controls the adjustment device according to a first control table that represents a relation between the type of the sensitivity determined by the analyzer and the level of the sensitivity determined by the analyzer and a control signal for controlling the adjustment device, and when the temperature determiner determines that the room is at the comfortable temperature, the controller controls the adjustment device according to a second control table that is different from the first control table.

2. The air conditioning system according to claim 1, further comprising a human sensor to detect a position of the user inside the room, wherein the controller determines a space for which an environment is to be adjusted on the basis of a detection result from the human sensor.

3. The air conditioning system according to claim 2, wherein the human sensor detects a body temperature of the user in a noncontact manner.

4. The air conditioning system according to claim 1, further comprising:

a camera to obtain image data of the user; and a corrector to correct the level of the sensitivity determined by the analyzer on the basis of the image data obtained by the camera, wherein the controller controls the adjustment device on the basis of the type of the sensitivity determined by the analyzer and the level of the sensitivity corrected by the corrector.

5. The air conditioning system according to claim 4, wherein the controller is configured to identify a position of the user inside the room on the basis of the image data obtained by the camera, and determine a space for which an environment is to be adjusted.

6. The air conditioning system according to claim 1, further comprising a remote controller to remotely operate the indoor device, wherein the collector is provided in the remote controller.

7. An air conditioning system comprising:

a collector to obtain a voice data of a user;

a voice recognizer to generate character-string data on the basis of the voice data;

a memory to store therein a search table having a standard keyword that indicates a type of sensitivity to an environment inside a room and derivative keywords, each of the derivative keywords respectively indicates the same type of the sensitivity as the standard keyword while indicating a different level of the sensitivity;

an analyzer to determine, using the search table, a type of the sensitivity felt by the user and a level of the sensitivity felt by the user on the basis of the character-string data and the search table;

a controller to output a control signal to an adjustment device in an indoor device, the adjustment device adjusting an environment inside the room on the basis of the type of the sensitivity determined by the analyzer and the level of the sensitivity determined by the analyzer;

a room-temperature sensor to detect temperature inside the room;

a body-temperature sensor to detect body temperature of the user; and a first corrector to correct the level of the sensitivity determined by the analyzer on the basis of detection results from the room-temperature sensor and the body-temperature sensor, wherein the controller controls the adjustment device on the basis of the type of the sensitivity determined by the analyzer and the level of the sensitivity corrected by the first corrector.

8. The air conditioning system according to claim 7, wherein the body-temperature sensor detects body temperature of the user in a noncontact manner, and the controller is configured to identify a position of the user inside the room on the basis of a detection result from the body-temperature sensor; and determine a space for which an environment is to be adjusted.

9. The air conditioning system according to claim 7, further comprising:

a communicator configured to wirelessly communicate with the body-temperature sensor to obtain body-temperature data of the user and position data of the user, and the communicator outputs the obtained body-temperature data and the obtained position data to the controller, wherein the body-temperature sensor is attached to the user, wherein the controller is configured to identify a position of the user inside the room on the basis of a detection result from the body-temperature sensor received via the communicator; and determine a space for which an environment is to be adjusted.

10. The air conditioning system according to claim 7, further comprising a human sensor to detect a position of the user inside the room, wherein the controller determines a space for which an environment is to be adjusted on the basis of a detection result from the human sensor.

11. The air conditioning system according to claim 10, wherein the human sensor detects a body temperature of the user in a noncontact manner.

12. The air conditioning system according to claim 7, further comprising:

a camera to obtain image data of the user; and a second corrector to correct the level of the sensitivity determined by the analyzer on the basis of the image data obtained by the camera, wherein the controller controls the adjustment device on the basis of the type of the sensitivity determined by the analyzer and the level of the sensitivity corrected by the second corrector.

13. The air conditioning system according to claim 12, wherein the controller is configured to identify a position of the user inside the room on the basis of the image data obtained by the camera; and determine a space for which an environment is to be adjusted.

14. The air conditioning system according to claim 7, further comprising a remote controller to remotely operate the indoor device, wherein
the collector is provided in the remote controller.

* * * * *